US012624183B2

(12) United States Patent
Chang et al.

(10) Patent No.: US 12,624,183 B2
(45) Date of Patent: May 12, 2026

(54) POLYAMIDE RECYCLING PROCESS AND POLYAMIDE OBTAINED BY RECYCLING PROCESS

(71) Applicant: KINGFA SCI. & TECH. CO., LTD., Guangdong (CN)

(72) Inventors: Huan Chang, Guangdong (CN); Nanbiao Ye, Guangdong (CN); Cheng Li, Guangdong (CN); Wohua Zhou, Guangdong (CN); Xinxin Liu, Guangdong (CN); Xiumei Zhu, Guangdong (CN); Yujun Su, Guangdong (CN); Lei Tang, Guangdong (CN); Xianbo Huang, Guangdong (CN)

(73) Assignee: KINGFA SCI. & TECH. CO., LTD., Guangdong (CN)

( * ) Notice: Subject to any disclaimer, the term of this patent is extended or adjusted under 35 U.S.C. 154(b) by 685 days.

(21) Appl. No.: 18/012,988

(22) PCT Filed: Dec. 29, 2020

(86) PCT No.: PCT/CN2020/140812
§ 371 (c)(1),
(2) Date: Dec. 27, 2022

(87) PCT Pub. No.: WO2022/001054
PCT Pub. Date: Jan. 6, 2022

(65) Prior Publication Data
US 2023/0250252 A1 Aug. 10, 2023

(30) Foreign Application Priority Data
Jun. 30, 2020 (CN) .......................... 202010611058.5

(51) Int. Cl.
*C08J 11/08* (2006.01)
*C08G 69/48* (2006.01)

(52) U.S. Cl.
CPC .............. *C08J 11/08* (2013.01); *C08G 69/48* (2013.01); *C08J 2377/00* (2013.01)

(58) Field of Classification Search
CPC ............ B29B 17/02; B29B 2017/0203; B29B 2017/0293; Y02W 30/62; C08J 11/00; C08J 11/04–08; C08J 2377/00–12
See application file for complete search history.

(56) References Cited

U.S. PATENT DOCUMENTS

| | | | | |
|---|---|---|---|---|
| 5,849,804 A | * | 12/1998 | Sarian | C08J 3/14 521/49 |
| 5,994,417 A | | 11/1999 | Roberts et al. | |
| 6,036,726 A | * | 3/2000 | Yang | C08J 11/08 528/495 |

FOREIGN PATENT DOCUMENTS

| | | | | | |
|---|---|---|---|---|---|
| CN | 101058695 A | * | 10/2007 | | |
| CN | 103642065 | | 3/2014 | | |
| CN | 109810284 | | 5/2019 | | |
| CN | 110423377 | | 11/2019 | | |
| CN | 111892743 | | 11/2020 | | |
| EP | 0603434 A1 | * | 6/1994 | .............. | C08J 11/08 |

OTHER PUBLICATIONS

Machine Translation of EP0603434A1. Jun. 29, 1994. (Year: 1994).*
Raju et al. Influence of nonsolvents on dissolution characteristics of nylon-6. J. Appl. Poly. Sci. 1991, 43, 1533-1538. (Year: 1991).*
"International Search Report (Form PCT/ISA/210) of PCT/CN2020/140812", mailed on Mar. 25, 2021, with English translation thereof, pp. 1-4.

* cited by examiner

*Primary Examiner* — Stephen E Rieth
(74) *Attorney, Agent, or Firm* — JCIPRNET

(57) ABSTRACT

A recycling process for a polyamide waste material includes the following steps: adding a polyamide waste material into a mixed solvent to obtain a solution, heating the solution to 50° C. to a reflux temperature of the solution, conducting stirring for dissolution, and then conducting decolorization treatment and filtration to obtain a polyamide solution; and adding the polyamide solution into water, precipitating polyamide as a solid in deionized water, and conducting separation to obtain recycled polyamide. The mixed solvent includes, in parts by weight, 10-30 parts of phenol and 15-40 parts of toluene.

8 Claims, No Drawings

POLYAMIDE RECYCLING PROCESS AND POLYAMIDE OBTAINED BY RECYCLING PROCESS

CROSS-REFERENCE TO RELATED APPLICATION

This application is a 371 application of International PCT application serial no. PCT/CN2020/140812 filed on Dec. 29, 2020, which claims the priority benefit of China application no. 202010611058.5, filed on Jun. 30, 2020. The entirety of each of the above mentioned patent applications is hereby incorporated by reference herein and made a part of this specification.

BACKGROUND

Technical Field

The present invention relates to the technical field of environment-friendly polymer materials, and in particular to a polyamide recycling process and polyamide obtained by the recycling process.

Description of Related Art

As one of four engineering plastics, polyamide has been widely used. However, after use, polyamide wastes are usually discarded directly as garbage in a large amount, resulting in energy waste and environmental pollution. Therefore, a cyclic utilization topic for recycling of the polyamide has been put forward all over the world. However, current recycling methods are still very simple. Except that some of the polyamide wastes with greatly reduced properties are used in the field of low-end products after granulation, the other polyamide wastes are usually burnt, and heat energy released during burning is used. On the one hand, the energy utilization efficiency is low. On the other hand, since a polyamide molecule contains the element N, nitrogenous compounds are released during burning, resulting in serious environmental pollution. However, according to a solution method for recycling of the polyamide, energy of polymers can be used to a maximum extent while it is ensured that properties are not reduced, the method is environmentally friendly, and little pollution is caused.

According to CN109810284A, a PA12 recycling method is provided. The method includes: S1, adding a PA12 waste material into a composite solvent system, and conducting stirring for dissolution; S2, heating the reaction system to 60-90° C., and conducting heat preservation in a water bath at constant temperature for 2-5 hours to make the PA12 waste material fully dissolved; S3, subjecting the solution obtained after a reaction to centrifugal separation, and adding deionized water into an upper supernatant for precipitation to obtain a PA12 precipitate; and S4, drying the PA12 precipitate under vacuum to thoroughly remove a solvent so as to obtain a PA12 powder. According to the invention, the solvent system includes 5-28% of formic acid, 1-10% of hydrochloric acid, 25-35% of acetic acid, and the balance of deionized water, and is a typical strong protic solvent. The polyamide is dissolved by a hydrogen bond formed by the polyamide, a strong polar hydrogen ion, and an acid radical ion. However, all the formic acid, the hydrochloric acid, and the acetic acid have extremely high corrosivity and volatility and high acidity, so that corrosion of equipment is likely to be caused. Moreover, in the step of adding the deionized water to precipitate out the polyamide, produced wastewater has extremely high acidity, and needs to be neutralized with an alkali before sewage treatment, so that environmental protection is not facilitated. During dissolution in a strong acidic environment, a part of amide bonds are hydrolyzed, so that a main chain of the polyamide is destroyed and converted into polyamide with low molecular weight, and properties of the recycled polyamide are greatly reduced. A centrifugation process is used as a solid separation method, which is not suitable for production in a large scale, and is high in cost.

According to a Chinese patent CN101058695A, a paint for metals is disclosed. A main curing substance includes any one of polyamide (PA), polyamide (PA6), polyamide (PA66), polyamide (PA610), polyamide (PA1010), and polyamide (PA12). A main solvent includes one or more of m-cresol, m-para-cresol, tricresol, and phenol. A co-solvent includes one or more of xylene, toluene, dimethylformamide, butanol, ethylene glycol ethyl ether, and ethylene glycol butyl ether. The polyamide can be well dissolved in the mixed solvent. However, since the solvent is used for not only dissolving the polyamide, but also dissolving other paint compositions, the amount of the main solvent is greater than that of the co-solvent. When the mixed solvent is used for recycling of the polyamide, a small amount of the polyamide cannot be precipitated out during precipitation, so that the yield is reduced.

SUMMARY

An objective of the present invention is to provide a recycling method for a polyamide waste material and polyamide obtained by the method. Phenol and toluene are used as main components of a mixed solvent, which has low volatility and irritation, environmental friendliness, little pollution, and low corrosivity to equipment, and is conducive to precipitation of polyamide. The obtained polyamide has good crystallization properties, the end-capping rate (with phenol as an end-capping agent) is increased, and the aging resistance, hydrolysis resistance, and alcoholysis resistance are improved. Convenience is provided for improving the application value of the recycled polyamide, and the application field of the recycled polyamide is expanded.

The present invention is realized by using the following technical solutions.

A polyamide recycling process is characterized by including the following steps:

adding a polyamide waste material into a mixed solvent to obtain a solution, heating the solution to 50° C. to a reflux temperature of the solution, conducting stirring for dissolution, and then conducting decolorization treatment and filtration to obtain a polyamide solution; and adding the polyamide solution into deionized water, precipitating polyamide in the deionized water, and conducting separation to obtain recycled polyamide.

The mixed solvent includes, in parts by weight, 10-30 parts of phenol and 15-40 parts of toluene. A weight ratio of the polyamide waste material to the mixed solvent is 1:10 to 1:2.

When the polyamide waste material is completely dissolved, the next step can be directly carried out or can be carried out after the temperature is lowered to room temperature (20-40° C.), so that the dissolved polyamide in the mixed solution will not be precipitated out due to the decrease of the temperature. The solution is subjected to the decolorization treatment, and then subjected to the filtration.

In general, a decolorizing agent is used for decolorization. After the decolorization, a clear and transparent polyamide solution (at this time, the state is as follows: other very light colors may still be retained, but no suspended particles are observed by naked eyes) flows into the deionized water. Under the action of the deionized water as a poor solvent, the polyamide is precipitated out. At this time, in the phenol/toluene/water system, the polyamide can be precipitated out as a particle with high crystallinity, and has better crystallization properties.

Preferably, after the polyamide waste material is added into the mixed solvent to obtain a solution, the solution is heated to 100° C. to a reflux temperature of the solution, and stirred for dissolution, and then the subsequent decolorization and filtration treatment are conducted. At preferred temperature, the phenol may undergo a condensation reaction with an end group of the polyamide, so that the end-capping rate is increased.

The decolorizing agent is added during the decolorization treatment, and a weight ratio of the decolorizing agent to the polyamide waste material is 1:8 to 1:12. The solution is heated to 50° C. to a reflux temperature of the solution, subjected to heat preservation for 0.5-2 hours, cooled to a temperature of less than 50° C., and then filtered to obtain a polyamide solution. The decolorizing agent is selected from, but not limited to, activated carbon, activated clay and the like.

Preferably, the mixed solvent may further include, in parts by weight, one or more of 0-5 parts of methanol, 0-20 parts of o-cresol, or 0-20 parts of benzyl alcohol.

When other solvents are added into the phenol/toluene solvent system, various properties of the polyamide will be improved. When a certain amount of the methanol is added, the fusion index can be increased, and the fluidity of the polyamide is improved. When a certain amount of the o-cresol or benzyl alcohol is added, the hydrolysis resistance, alcoholysis resistance, and heat aging resistance of the polyamide can be improved.

A weight ratio of the polyamide solution to the deionized water is 1:5 to 1:50.

The precipitated polyamide has a temperature of 0-50° C.

The mixed solvent, ratios and a dissolution method used in the method of the present invention can be used for dissolving almost all polyamide waste materials. The polyamide waste material is at least one selected from an aliphatic polyamide waste material and a semi-aromatic polyamide waste material. The aliphatic polyamide waste material is at least one selected from a PA6 waste material, a PA66 waste material, a PA12 waste material, a PA1010 waste material, and a PA1012 waste material. The semi-aromatic polyamide waste material is at least one selected from a PA6T waste material, a PA10T waste material, a PA10T1010 waste material, a PA10T1012 waste material, a PA10T10I waste material, and a PA10T6T waste material.

The process further includes a step of pulverization before the polyamide waste material is added into the mixed solvent. When the polyamide waste material is pulverized, the dissolution rate can be increased. When the surface of the polyamide waste material includes other materials insoluble in the mixed solvent of the present invention, the dissolution of the polyamide waste material can also be promoted by pulverization.

According to the recycling method of the present invention, the content of terminal carboxyl in the polyamide can be decreased, and the crystallization properties can be improved. According to the polyamide obtained by the above polyamide recycling process, the content of terminal carboxyl in the polyamide is in a range of 10-40 mol/t, the crystallization half-peak width is in a range of 6-12° C., and the crystallization enthalpy is in a range of −40 J/g to −60 J/g.

Compared with the prior art, the present invention has the following beneficial effects.

Compared with the prior art, the present invention has no corrosion to equipment and is environmentally friendly since the phenol/toluene solvent system with low volatility and irritation is used. Importantly, the phenol in the solvent can realize "secondary" end-capping of the polyamide, so that the end-capping rate is increased, the content of the terminal carboxyl is decreased, and the aging resistance is improved. After the polyamide solution is added into the deionized water, the polyamide can be fully precipitated out, so that the precipitation efficiency is high, and the obtained polyamide has good crystallization properties. Further, other properties, such as high fluidity, hydrolysis resistance, alcoholysis resistance, and heat aging resistance, of a recycled polyamide material are investigated after benzyl alcohol, o-cresol, methanol, and other solvent components are added, so that the application field of the recycled polyamide material is widened.

DESCRIPTION OF THE EMBODIMENTS

The present invention is described in detail below in conjunction with specific embodiments. The following embodiments are favorable for persons skilled in the art to further understand the present invention, and are not intended to limit the present invention in any manner. It should be noted that various modifications and improvements may be made by persons of ordinary skill in the art without departing from the concept of the present invention. All the modifications and improvements belong to the protection scope of the present invention.

Sources of raw materials used in the present invention are as follows.

A polyamide waste material PA12 is derived from recycled materials such as plumbing pipes and peripheral parts of automobile engines, includes a small amount of a toner, and theoretically has a PA12 content of about 95%-97%.

A polyamide waste material PA66 is derived from recycled materials of gears, bearings and other parts of mechanical equipment, includes reinforced glass fibers, and theoretically has a PA66 content of about 65%-70%.

A polyamide waste material PA10T is derived from recycled materials of peripheral parts of engines, includes reinforced glass fibers, and theoretically has a PA10T content of about 60%-70%. Phenol is industrially pure.

Toluene is industrially pure.

Methanol is industrially pure.

Benzyl alcohol is industrially pure.

O-cresol is industrially pure.

Various property test methods are as follows.

(1) Content of terminal carboxyl: The contents of terminal amino and terminal carboxyl in a polymer are measured by a potentiometric titrator. 0.45 g of a material is weighed, and 50 mL of preheated and dissolved o-cresol is added and heated for reflux until a sample is dissolved. The sample is put in a water tank at 50° C. and cooled to 50° C. 0.5 mL of a formaldehyde solution is added, and a magtron stirring solution is added to obtain a mixed solution. An electrode test part of an automatic potentiometric titrator is soaked in the mixed solution, and a calibrated KOH-ethanol solution is used to titrate the content of the terminal carboxyl at the test end.

(2) Crystallization half-peak width: With reference to the standard ASTM D3418-2003, during a test at a flow rate of 20 mL/min under the protection of nitrogen atmosphere, a sample is heated from 30° C. to 350° C. at a heating rate of 10° C./min, subjected to heat preservation at 350° C. for 5 minutes, and then cooled to 50° C. at a cooling rate of 10° C./min. At this time, the crystallization peak temperature in a crystallization curve is used as a melting point, and the crystallization half-peak width is in a temperature range of a crystallization peak at ½ of a crystallization peak height.

(3) Crystallization enthalpy: With reference to the standard ASTM D3418-2003, during a test at a flow rate of 20 mL/min under the protection of nitrogen atmosphere, a sample is heated from 30° C. to 350° C. at a heating rate of 10° C./min. subjected to heat preservation at 350° C. for 5 minutes, and then cooled to 50° C. at a cooling rate of 10° C./min. At this time, the area of a crystallization peak is used as a crystallization enthalpy value.

(4) Fusion index: With reference to the standard ASTM D1238-2010, a material is tested by a standard fusion index instrument at 190° C. under at a load pressure of 1.0 kg to obtain the mass of a molten material flowing through a standard capillary tube within 10 minutes.

(5) Hydrolysis resistance: Recycled polyamide is subjected to injection molding to obtain a standard sample strip, and the tensile strength and bending strength of the material sample strip before and after hydrolysis treatment are tested. The hydrolysis treatment is conducted under the conditions that the test sample strip is put in water at 100° C. and then boiled for 3 hours. After comparison with mechanical properties before boiling, the retention rates of the tensile strength and bending strength are calculated in percentages.

(6) Alcoholysis resistance: Recycled polyamide is subjected to injection molding to obtain a standard sample strip, and the tensile strength and bending strength of the material sample strip before and after alcoholysis treatment are tested. The alcoholysis treatment is conducted under the conditions that the test sample strip is put in ethanol at 70° C., heated, and then soaked for 3 hours. After comparison with mechanical properties before the alcoholysis treatment, the retention rates of the tensile strength and bending strength are calculated in percentages.

(7) Heat aging resistance: Recycled polyamide is subjected to injection molding to obtain a standard sample strip, and the tensile strength and bending strength of the material sample strip before and after heat aging treatment are tested. The heat aging treatment is conducted under the conditions that the test sample strip is put in an oven at 100° C. and then baked for 12 hours. After comparison with mechanical properties before baking, the retention rates of the tensile strength and bending strength are calculated in percentages.

Example 1

100 g of a polyamide waste material PA12 was added into a mixed solvent including 100 g of phenol and 200 g of toluene, heated to 100° C., and stirred for dissolution. After 10 g of activated carbon was added, an obtained mixture was subjected to heat preservation at 100° C. under stirring for 0.5 hour, cooled to 40° C., and then filtered to obtain a polyamide solution. Then, the polyamide solution was slowly added into 3.000 g of deionized water to precipitate out polyamide. After the polyamide was dried, other properties were tested.

Example 2

Different from Example 1, 20 g of methanol was further added into the mixed solvent.

Example 3

Different from Example 1, 50 g of o-cresol was further added into the mixed solvent.

Example 4

Different from Example 1, 30 g of benzyl alcohol was further added into the mixed solvent.

Example 5

Different from Example 1, 100 g of a polyamide waste material PA12 was added into a mixed solvent including 100 g of phenol and 200 g of toluene, heated to 60° C., and stirred for dissolution.

Example 6

100 g of a polyamide waste material PA66 was added into a mixed solvent including 80 g of phenol and 160 g of toluene, heated to 80° C., and stirred for dissolution. After 10 g of activated carbon was added, an obtained mixture was heated to 100° C., subjected to heat preservation under stirring for 0.5 hour, cooled to 30° C., and then filtered to obtain a polyamide solution. Then, the polyamide solution was slowly added into 3,000 g of deionized water to precipitate out polyamide. After the polyamide was dried, other properties were tested.

Example 7

100 g of a polyamide waste material PA10T was added into a mixed solvent including 90 g of phenol, 160 g of toluene, and 20 g of methanol, heated to 80° C., and stirred for dissolution. After 10 g of activated carbon was added, an obtained mixture was subjected to heat preservation at 80° C. under stirring for 0.5 hour, cooled to 40° C., and then filtered to obtain a polyamide solution. Then, the polyamide solution was slowly added into 3,000 g of deionized water to precipitate out polyamide. After the polyamide was dried, other properties were tested.

Example 8

Different from Example 1, 15 g of methanol, 50 g of o-cresol, and 30 g of benzyl alcohol were further added into the mixed solvent.

Comparative Example 1

100 g of a polyamide waste material PA12 was added into 1,500 g of a mixed solvent (including 15% of formic acid, 10% of hydrochloric acid, 35% of acetic acid, and 40% of water), stirred at 80° C. for dissolution for 4 hours, and then subjected to centrifugal separation (at a rotation speed of 4,000 R/min). An upper supernatant was added into 1,500 g of deionized water for precipitation to obtain a PA12 precipitate. After the precipitate was dried, other properties were tested.

Comparative Example 2

100 g of a polyamide waste material PA12 was added into 200 g of phenol, heated to 100° C. and stirred for dissolution. After 10 g of activated carbon was added, an obtained mixture was subjected to heat preservation under stirring for 0.5 hour, cooled to 60° C., and then filtered to obtain a polyamide solution. Then, the polyamide solution was slowly added into 3,000 g of deionized water to precipitate out polyamide. After the polyamide was dried, other properties were tested.

Comparative Example 3

100 g of a polyamide waste material PA12 was added into a mixed solvent including 100 g of o-cresol and 200 g of toluene, heated to 100° C., and stirred for dissolution. After 10 g of activated carbon was added, an obtained mixture was subjected to heat preservation under stirring for 0.5 hour, cooled to 40° C., and then filtered to obtain a polyamide solution. Then, the polyamide solution was slowly added into 3,000 g of deionized water to precipitate out polyamide. After the polyamide was dried, other properties were tested.

separately added into the recycling solvent for synergy, the hydrolysis resistance, heat aging resistance, and alcoholysis resistance of the recycled polyamide can be significantly improved.

According to Example 1 and Comparative Example 1, it can be seen that when the mixed acidic solvent is used as the recycling solvent, not only is the content of the terminal carboxyl in the recycled polyamide high, crystallization properties are reduced, but also the hydrolysis resistance, heat aging resistance, and alcoholysis resistance are poor. At this time, the fusion index is high since a part of molecular chains are broken in a recycling process of the polyamide.

According to Example 1 and Comparative Example 2, it can be seen that when the single phenol is used as the recycling solvent, the crystallization properties of the recycled polyamide are also reduced to a certain extent, and the hydrolysis resistance, heat aging resistance, and alcoholysis resistance are greatly reduced.

According to Example 1 and Comparative Example 3, it can be seen that when the mixed solvent including the o-cresol and the toluene is used, the content of the terminal carboxyl in the recycled polyamide is high, and the hydrolysis resistance, heat aging resistance, and alcoholysis resistance are low.

What is claimed is:

1. A polyamide recycling process, comprising following steps: adding a polyamide waste material into a mixed

TABLE 1

Various test results of examples and comparative examples

| | Example 1 | Example 2 | Example 3 | Example 4 | Example 5 | Example 6 |
|---|---|---|---|---|---|---|
| Content of terminal carboxyl, mol/t | 35 | 36 | 36 | 35 | 41 | 31 |
| Crystallization half-peak width, ° C. | 10.3 | 10.3 | 10.2 | 10.3 | 10.4 | 8.1 |
| Crystallization enthalpy, J/g | −42 | −42 | −42 | −42 | −43 | −41 |
| Fusion index, g/10 min | 16 | 19 | 16 | 16 | 15 | 9 |
| Hydrolysis resistance, % | 95 | 96 | 99 | 99 | 95 | 92 |
| Heat aging resistance, % | 96 | 96 | 97 | 98 | 94 | 94 |
| Alcoholysis resistance, % | 96 | 96 | 98 | 97 | 95 | 92 |

| | Example 7 | Example 8 | Comparative Example 1 | Comparative Example 2 | Comparative Example 3 |
|---|---|---|---|---|---|
| Content of terminal carboxyl, mol/t | 26 | 36 | 79 | 38 | 66 |
| Crystallization half-peak width, ° C. | 6.9 | 10.3 | 10.9 | 10.6 | 10.7 |
| Crystallization enthalpy, J/g | −54 | −42 | −45 | −45 | −43 |
| Fusion index, g/10 min | 5 | 19 | 19 | 15 | 16 |
| Hydrolysis resistance, % | 99 | 100 | 87 | 93 | 89 |
| Heat aging resistance, % | 97 | 98 | 80 | 71 | 85 |
| Alcoholysis resistance, % | 98 | 99 | 83 | 82 | 88 |

According to Example 1 and Example 2, it can be seen that when the methanol is added into the recycling solvent for synergy, not only can the fusion index of the recycled polyamide be effectively increased, but also other properties can be maintained or even improved.

According to Example 1, Example 3, and Example 4, it can be seen that when the o-cresol and the benzyl alcohol are solvent to obtain a solution, heating the solution to 50° C. to a reflux temperature of the solution, conducting stirring for dissolution, and then conducting decolorization treatment and filtration to obtain a polyamide solution; and adding the polyamide solution into deionized water, precipitating polyamide in the deionized water, and conducting separation to obtain recycled polyamide; wherein the mixed solvent comprises, in parts by weight, 10-30 parts of phenol and 15-40 parts of toluene; and a weight ratio of the polyamide waste material to the mixed solvent is 1:10 to 1:2, wherein a decolorizing agent is added during the decolorization treatment, and a weight ratio of the decolorizing agent to the polyamide waste material is 1:8 to 1:12; and the solution is heated to 50° C. to the reflux temperature of the solution, subjected the solution to heat preservation for 0.5-2 hours, cooled the solution to a temperature of less than 50° C., and then filtered the solution to obtain the polyamide solution.

2. The polyamide recycling process according to claim 1, wherein after the polyamide waste material is added into the mixed solvent to obtain the solution, the solution is heated to 100° C. to the reflux temperature of the solution, and stirred for dissolution, and then the decolorization treatment and the filtration treatment are subsequently conducted.

3. The polyamide recycling process according to claim 1, wherein a weight ratio of the polyamide solution to the deionized water is 1:5 to 1:50.

4. The polyamide recycling process according to claim 1, wherein the mixed solvent further comprises, in parts by weight, one or more of 0-5 parts of methanol, 0-20 parts of o-cresol, or 0-20 parts of benzyl alcohol.

5. The polyamide recycling process according to claim 1, wherein a temperature in the step of precipitating the polyamide in the deionized water is 0-50° C.

6. The polyamide recycling process according to claim 1, wherein the decolorizing agent is at least one selected from activated carbon and activated clay.

7. The polyamide recycling process according to claim 1, wherein the polyamide waste material is at least one selected from an aliphatic polyamide waste material and a semi-aromatic polyamide waste material; the aliphatic polyamide waste material is at least one selected from a PA6 waste material, a PA66 waste material, a PA12 waste material, a PA1010 waste material, and a PA1012 waste material; and the semi-aromatic polyamide waste material is at least one selected from a PA6T waste material, a PA10T waste material, a PA10T10I waste material, a PA10T1010 waste material, a PA10T1012 waste material, and a PA10T6T waste material.

8. The polyamide recycling process according to claim 1, wherein further comprising a step of pulverization before the polyamide waste material is added into the mixed solvent.

* * * * *